United States Patent Office 2,738,349
Patented Mar. 13, 1956

2,738,349

PHENTHIAZINYLALKYL-SULFONATES AND PROCESSES

Paul Gailliot, Paris, and Jean Robert, Maisons-Laffitte, France, assignors to Societe des Usines Chimiques Rhone-Poulenc, Paris, France, a French body corporate No Drawing. Application March 15, 1954, Serial No. 416,418

Claims priority, application Great Britain April 20, 1953

12 Claims. (Cl. 260—243)

This invention relates to phenthiazine derivatives and particularly to sulphonic esters of 10-hydroxyalkyl-phenthiazines and processes for their preparation.

According to the present invention there are provided sulphonic esters of the general formula:

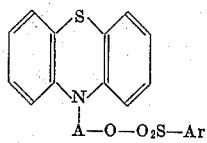

A—O—O₂S—Ar where A represents a divalent, straight or branched, saturated, aliphatic hydrocarbon chain containing either 2 or 3 carbon atoms with at least two of said carbon atoms between the ring nitrogen atom and the adjacent sidechain oxygen atom, and Ar represents an aromatic radical, e. g. phenyl or p-tolyl. The compounds are either unsubstituted in the benzene nuclei or contain in the 1- or 3-position (Beilstein nomenclature) a substituent in the form of a halogen atom, (e. g. chlorine), or a methyl or methoxy group.

According to a feature of the present invention, sulphonic esters of the foregoing general formula are prepared by reacting an aryl sulphonyl halide ArSO₂Hal with a 10-hydroxyalkyl-phenthiazine:

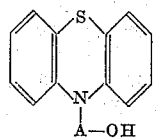

A—OH or by reacting a silver salt of an aryl monosulphonic acid ArSO₃Ag with a 10-halogenoalkyl-phenthiazine:

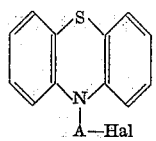

A—Hal the phenthiazine reactant in each case being either otherwise unsubstituted or having in the 1- or 3-position (Beilstein nomenclature) a substituent in the form of a halogen atom, (e. g. chlorine), or a methyl or methoxy group.

The following examples will serve to illustrate the invention:

Example I

To a solution of 1-(10'-phenthiazinyl)-propanol-2 (B. P. 0.35 mm./Hg=190–195° C.) (20 g.) in pyridine (60 cc.) there is added a solution of p-toluene sulphonyl chloride (15.45 g.) in pyridine (40 cc.) and the mixture is agitated at room temperature overnight. The reaction mixture is poured onto crushed ice (500 g.) and an oily precipitate forms which crystallises rapidly. Water (500 cc.) is added to complete the precipitation and the product is filtered off, washed with water and dried in air. It is then recrystallised from ethyl acetate (145 cc.). 1-(10'-phenthiazinyl)-propyl-2-p-toluene sulphonate (16 g.) is thus obtained, which melts at 150–151° C. (Kofler).

Example II

A solution of silver p-toluene sulphonate (1.45 g.) and 1-(10'-phenthiazinyl)-2-chloropropane (1.4 g.) in acetonitrile (15 cc.) is heated under reflux for 1½ hours. The reaction mixture is allowed to cool and the silver chloride precipitated is filtered off. The filtrate is concentrated under vacuum and is then taken up in chloroform (15 cc.). The insoluble material (silver chloride) is filtered off and the filtrate concentrated under vacuum. The solid residue obtained is taken up in ethyl acetate (8 cc.) and the insoluble material is filtered off and washed with ethyl acetate (2 cc.). There is thus obtained 1-(10'-phenthiazinyl) propyl-2-p-toluene sulphonate (1.35 g.), which after recrystallisation from ethyl acetate melts at 149–151° C. (Kofler).

Example III

A solution of silver p-toluene sulphonate (1.67 g.) and 1-(10'-phenthiazinyl)-2-chloroethane (1.5 g.) in dimethylformamide (10 cc.) is heated under reflux for 2½ hours. The reaction mixture is allowed to cool; the silver chloride precipitated is filtered off and washed with dimethylformamide (2 cc.). On pouring the filtrate into water (50 cc.) a thick oil is precipitated which is extracted with ether (50 cc., then twice with 25 cc.). The combined ether extracts are washed with water (25 cc.) and dried over sodium sulphate. On driving off, under vacuum, some of the ether, the product crystallises. The product is filtered off and washed with ether (5 cc.). There is thus obtained 1-(10'-phenthiazinyl)ethyl-2-p-toluene sulphonate (0.9 g.) which, after recrystallisation from ethyl acetate, melts at 141° C. (Kofler).

Example IV

Benzene sulphonyl chloride (6.4 g.) is added to a solution of 1-(3'-chloro-10'-phenthiazinyl)propan-3-ol (10 g.) in pyridine (20 cc.). The reaction mixture is stirred for 5 hours, left overnight at room temperature and then poured into water (200 cc.). The product is precipitated as an orange oil which will not crystallise. After neutralisation with hydrochloric acid (19 cc., density 1.19), the product is extracted with chloroform (100 cc., 30 cc. and then 20 cc.). The combined chloroform extracts are washed with 2 N hydrochloric acid (30 cc.) and then with water (50 cc.). After drying the chloroform extracts over sodium sulphate, the chloroform is driven off under vacuum by heating on a water-bath. There is thus obtained an orange-red very viscous oil which is 1-(3'-chloro-10'-phenthiazinyl)propyl-3-benzene sulphonate (12.5 g.).

The identity of the compound is demonstrated by its analysis and by reaction with diethylamine which gives 1-(3'-chloro-10'-phenthiazinyl)-3-diethylamino-propane, the hydrochloride of which melts at 178° C. (Kofler).

Example V p-Toluene sulphonyl chloride (7.05 g.) is added to a solution of 1-(3'-methyl-10'-phenthiazinyl)propan-3-ol (10 g.) in pyridine (50 cc.). The reaction mixture is stirred for 3 hours, left overnight at room temperature and then poured into a mixture of ice (250 g.), water (250 cc.) and hydrochloric acid (50 cc., density 1.19). An oil is precipitated, which is extracted with diethyl ether (two times 200 cc.). The ether solutions are combined, washed with 50 cc. of a saturated solution of sodium bicarbonate and then with 50 cc. of water. After drying the ether solution over sodium sulphate, the ether is driven off by heating on a water-bath. There is thus obtained 1-(3'-methyl-10' - phenthiazinyl)propyl-3-p-toluene sulphonate (8.5 g.).

The identity of the compound is demonstrated by its analysis and by reaction with diethylamine which gives 1-(3'-methyl-10'-phenthiazinyl)-3-diethylamino-propane, the hydrochloride of which melts at 166°–168° C.

The sulphonic esters of the present invention are of especial value as intermediates in the preparation of compounds of therapeutic activity. Thus, they may be reacted with primary or secondary amines to yield compounds of outstanding pharmacological activity, e. g. the product 1 - (3' - chloro-10'-phenthiazinyl)-3-diethylamino-propane referred to at the end of Example IV above. The use of the sulphonic esters of the present invention in the production of compounds of therapeutic value is described in co-pending application Ser. No. 422,698.

We claim:

1. A compound selected from the class consisting of sulphonic esters of the general formula:

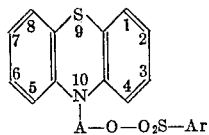

where A represents a divalent, saturated aliphatic hydrocarbon grouping containing from 2 to 3 carbon atoms, at least 2 carbon atoms of said grouping being linked as a chain between the ring nitrogen atom and the adjacent oxygen atom of the said formula, Ar represents an aromatic wholly hydrocarbon, monocyclic radical and corresponding compounds containing in one only of the 1- and 3-positions a group selected from the class consisting of halogen, methyl and methoxy groups.

2. 1-(10'-phenthiazinyl)propyl-2-p-toluene sulphonate having the formula:

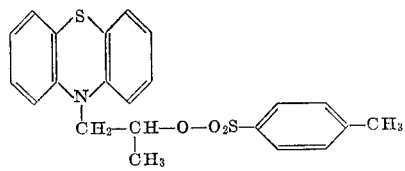

3. 1-(10' - phenthiazinyl)ethyl-2-p-toluene sulphonate having the formula:

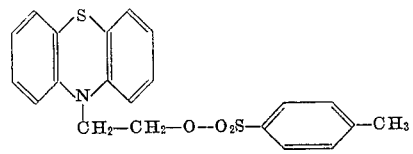

4. 1-(3'-chloro-10'-phenthiazinyl)propyl-3-benzene sulfonate having the formula:

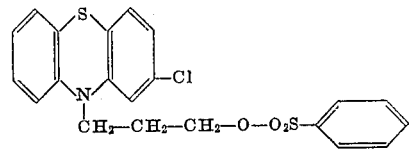

5. 1-(3'-methyl - 10' - phenthiazinyl) propyl-3-p-toluene sulphonate having the formula:

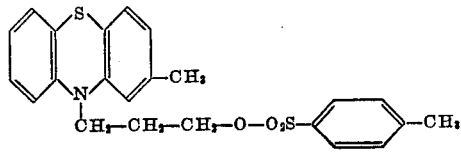

6. A process for the production of a compound selected from the class consisting of sulphonic esters of the general formula:

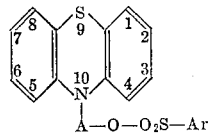

where A represents a divalent saturated aliphatic hydrocarbon grouping containing from 2 to 3 carbon atoms, at least 2 carbon atoms of said grouping being linked as a chain between the ring nitrogen atom and the adjacent oxygen atom of the said formula, Ar represents an aromatic wholly hydrocarbon monocyclic radical and corresponding compounds containing in one only of the 1- and 3-positions a group selected from the class consisting of halogen, methyl and methoxy groups, which comprises reacting an aryl sulphonyl halide of the formula ArSO$_2$Hal with a 10-hydroxyalkyl-phenthiazine selected from compounds of the formula:

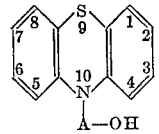

and corresponding compounds containing in one only of the 1- and 3-positions a group selected from the class consisting of halogen, methyl and methoxy groups.

7. A process for the production of a compound selected from the class consisting of sulphonic esters of the general formula:

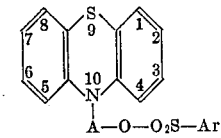

where A represents a divalent, saturated aliphatic hydrocarbon grouping containing from 2 to 3 carbon atoms, at least 2 carbon atoms of said grouping being linked as a chain between the ring nitrogen atom and the adjacent oxygen atom of the said formula, Ar represents an aromatic wholly hydrocarbon monocyclic radical and corresponding compounds containing in one only of the 1- and 3-positions a group selected from the class consisting of halogen, methyl and methoxy groups, which comprises reacting a silver salt of an aryl sulphonic acid of the formula ArSO$_3$Ag with a 10-halogenoalkyl-phenthiazine selected from compounds of the formula:

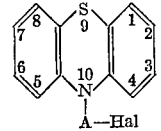

and corresponding compounds containing in one only of the 1- and 3-positions a group selected from the class consisting of halogen, methyl and methoxy groups.

8. A process for the production of 1-(10'-phenthiazinyl)propyl-2-p-toluene sulphonate having the formula:

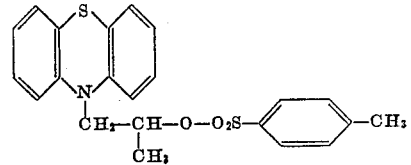

which comprises reacting 1-(10'-phenthiazinyl)-propanol-2 with p-toluene sulphonyl chloride, in the presence of an acid-binding agent.

9. A process for the production of 1-(10'-phenthiazinyl)propyl-2-p-toluene sulphonate having the formula:

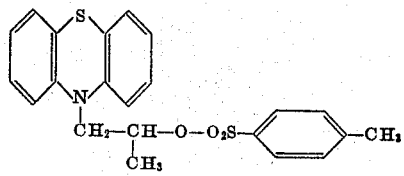

which comprises reacting 1-(10'-phenthiazinyl)-2-chloropropane with silver p-toluene sulphonate.

10. A process for the production of 1-(10'-phenthiazinyl)ethyl-2-p-toluene sulphonate having the formula:

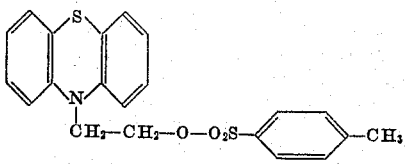

which comprises reacting 1-(10'-phenthiazinyl)-2-chloroethane with silver p-toluene sulphonate.

11. A process for the production of 1-(3'-chloro-10'-phenthiazinyl)-propyl-3-benzene sulphonate having the formula:

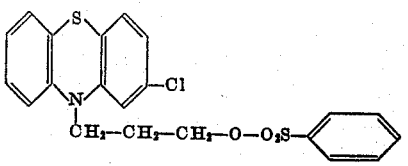

which comprises reacting 1-(3'-chloro-10'-phenthiazinyl) propan-3-ol with benzene sulphonyl chloride in the presence of an acid-binding agent.

12. A process for the production of 1-(3'-methyl-10'-phenthiazinyl)-propyl-3-p-toluene sulphonate having the formula:

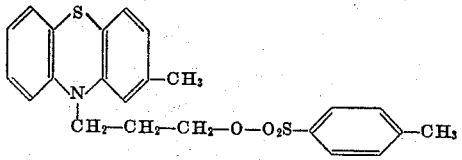

which comprises reacting 1-(3'-methyl-10'-phenthiazinyl) propan-3-ol with p-toluene sulphonyl chloride in the presence of an acid-binding agent.

References Cited in the file of this patent

UNITED STATES PATENTS

| | | |
|---|---|---|
| 2,395,386 | Baker, Jr. | Feb. 26, 1946 |
| 2,412,116 | Baker, Jr. | Dec. 3, 1946 |
| 2,486,416 | Jackson | Nov. 1, 1949 |
| 2,671,105 | Sprague et al. | Mar. 2, 1954 |

FOREIGN PATENTS

| | | |
|---|---|---|
| 129,843 | Sweden | Oct. 24, 1950 |